United States Patent [19]
Lacomme

[11] Patent Number: 4,727,375
[45] Date of Patent: Feb. 23, 1988

[54] PROCESS FOR ADAPTING THE POST INTEGRATION IN A SWITCHED PULSE REPETITION FREQUENCY RADAR AND A CIRCUIT IMPLEMENTING THIS PROCESS

[75] Inventor: Philippe Lacomme, Villejuif, France
[73] Assignee: Thomson-CSF, Paris, France
[21] Appl. No.: 810,376
[22] Filed: Dec. 18, 1985
[30] Foreign Application Priority Data
  Dec. 21, 1984 [FR] France ............... 84 19648
[51] Int. Cl.$^4$ .................. G01S 7/30; G01S 13/22
[52] U.S. Cl. ........................ 342/91; 342/137; 342/203
[58] Field of Search ........... 342/91, 137, 162, 163, 342/202, 203, 90, 93; 307/355, 356, 357, 358, 360, 361

[56] References Cited
U.S. PATENT DOCUMENTS
  3,765,017 10/1973 Dentino ................ 342/137 X
  4,137,532 1/1979 Taylor, Jr. et al. ......... 342/137 X FOREIGN PATENT DOCUMENTS
  3321263 12/1984 Fed. Rep. of Germany ...... 342/203

Primary Examiner—Theodore M. Blum
Assistant Examiner—Gilberto Barrón, Jr.
Attorney, Agent, or Firm—Oblon, Fisher, Spivak, McClelland & Maier

[57] ABSTRACT

The invention relates to a process for adapting the post integration in a switched pulse repetition frequency radar and a circuit implementing this process. For that, the post integration of the detected signals is effected as a function of the signal received from the Doppler filter. For that, switches are used controlled by comparator circuits.

The invention is useful in frequency ambiguous coherent Doppler radars using recurrence frequency switching by blocks.

3 Claims, 12 Drawing Figures

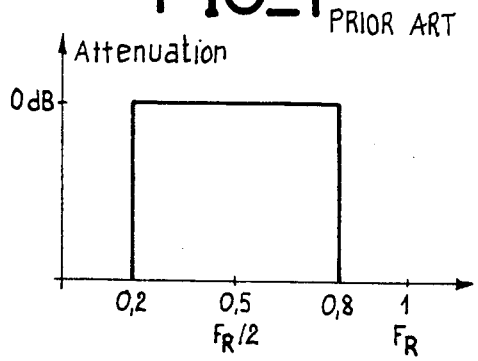
FIG_1 PRIOR ART
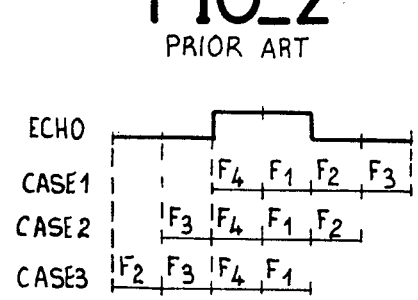
FIG_2 PRIOR ART
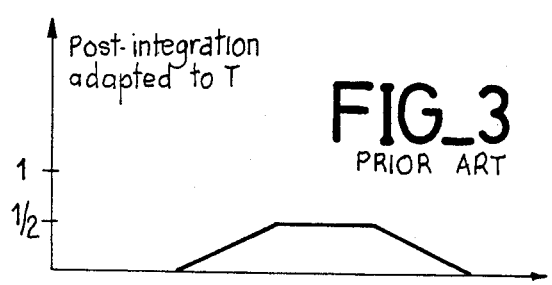
FIG_3 PRIOR ART
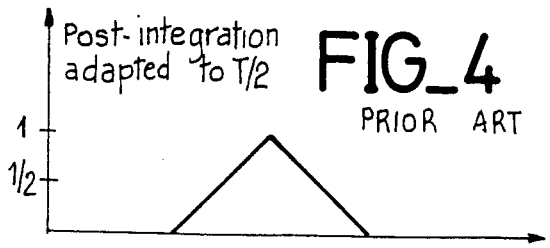
FIG_4 PRIOR ART
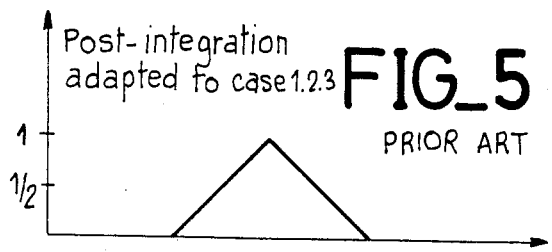
FIG_5 PRIOR ART

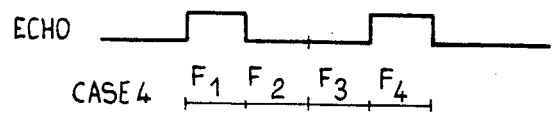
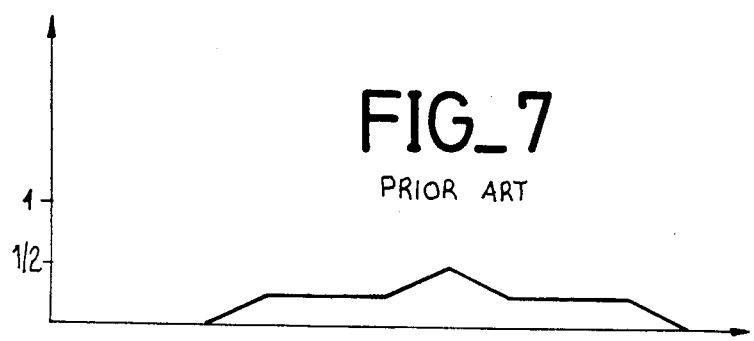
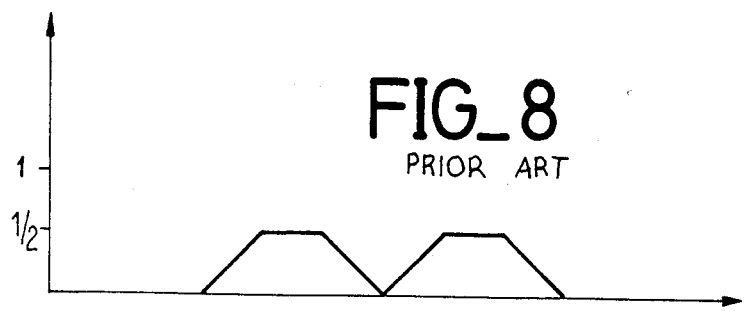
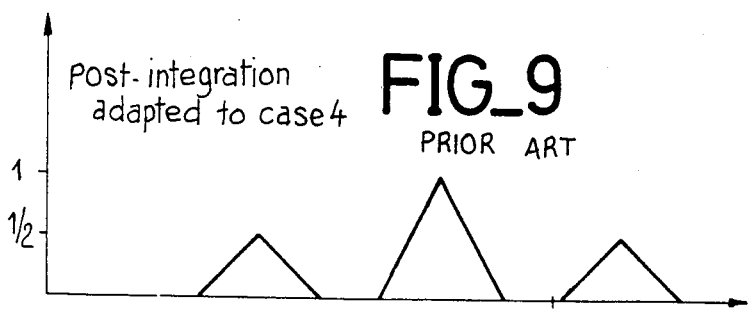

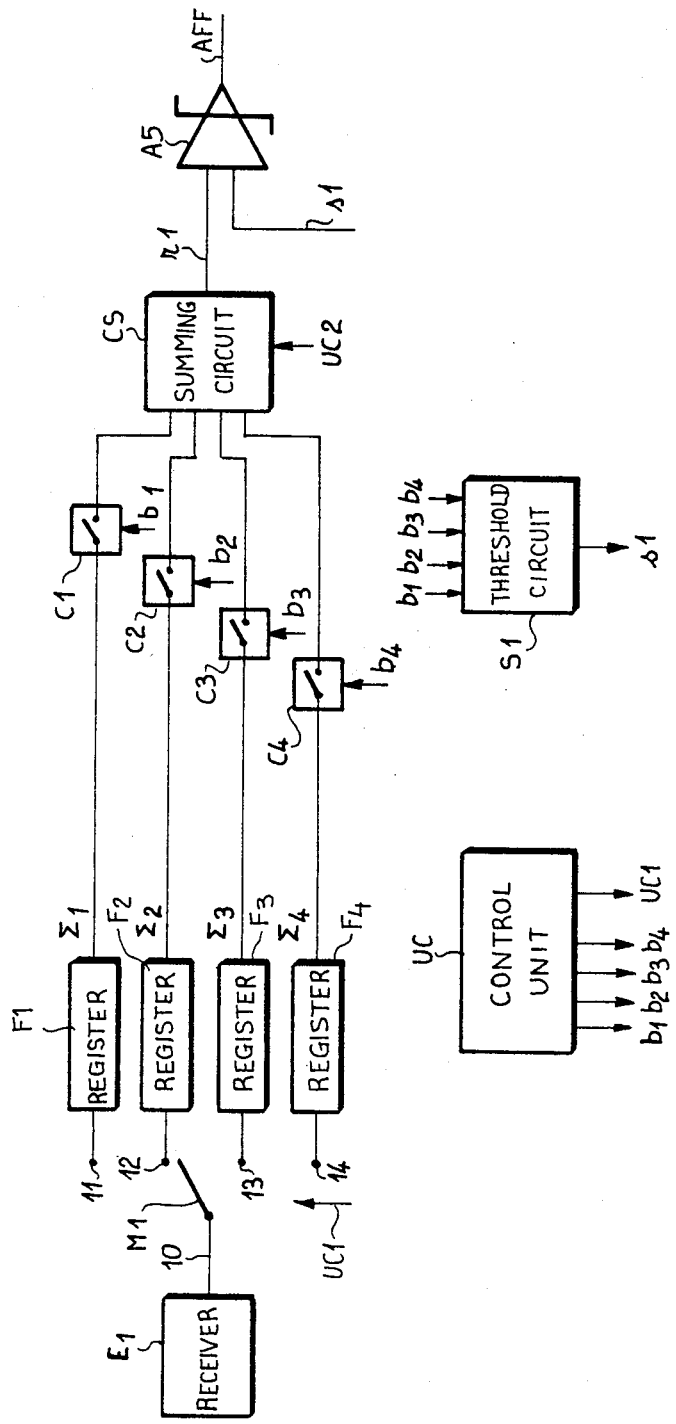

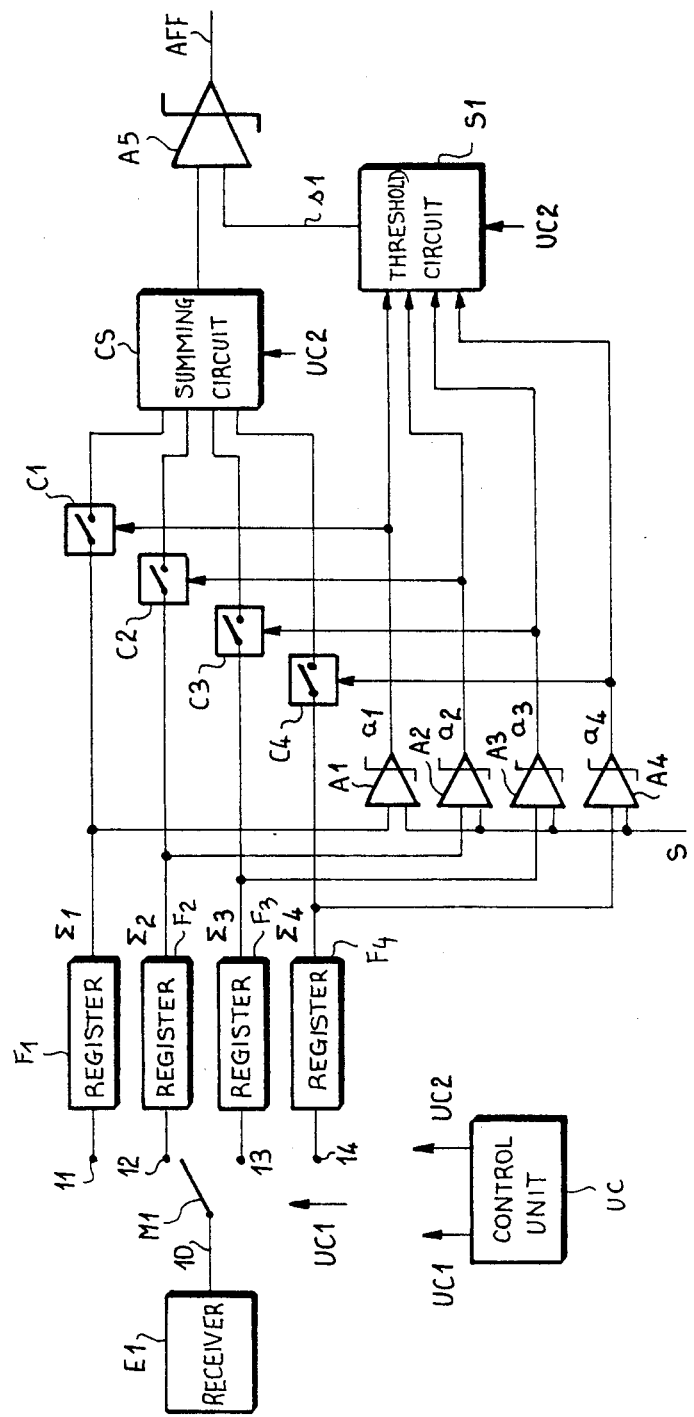

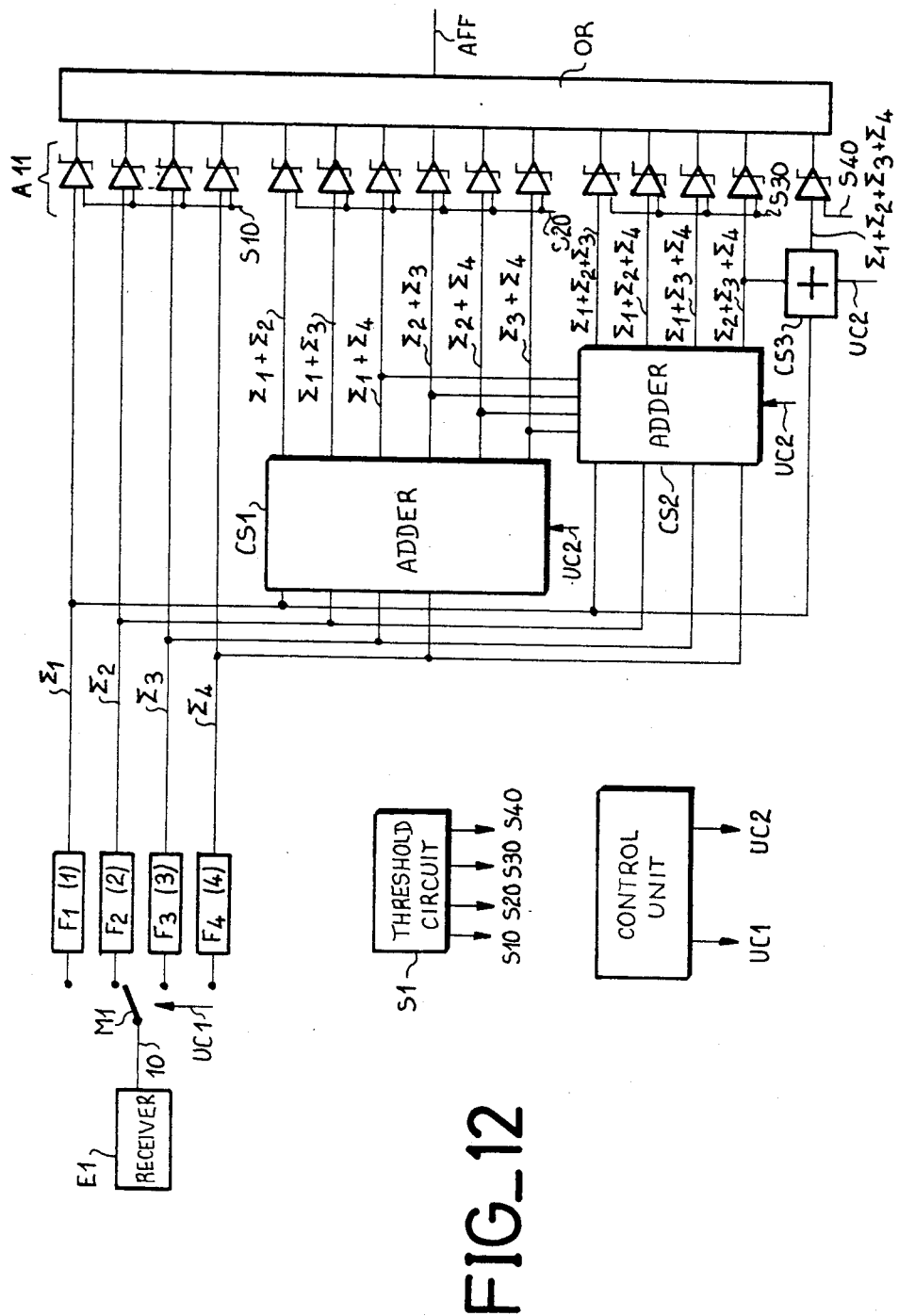
FIG_12

PROCESS FOR ADAPTING THE POST INTEGRATION IN A SWITCHED PULSE REPETITION FREQUENCY RADAR AND A CIRCUIT IMPLEMENTING THIS PROCESS

BACKGROUND OF THE INVENTION

The invention relates to a process and a circuit for adapting a post integration in a switched pulse repetition frequency (PRF) Doppler radar system.

In a low frequency radar, the relatively low pulse repetition frequency implies, for a Doppler filter used at low altitude, a pattern (such as shown in FIG. 1) in which the ratio between the rejection zone and the passing zone is high (40%). Since a large number of aerial targets whose ambiguous speed corresponds to the rejection zone of the filter are not detected, the recurrence frequency FR is varied during the illumination time of the target which shifts the ambiguous frequencies of the targets, without disturbing the echoes whose frequency is less than FR/2.

All the aerial targets are then detected during a fraction of the illumination time corresponding to the recurrence frequencies such that their ambiguous frequencies fall into the passing zone of the filter. It follows that the echo is chopped, therefore the conventional post integration is not adapted to this type of echo.

In fact, according to the known technique, the post integration is based:

either on a total illumination time, which causes losses when the target only appears at the output of the Doppler filter for a small fraction of the illumination time, or on an average or small fraction of this illumination time, which causes a loss when the echo is present for a large fraction of this illumination time.

A considerable loss of detection accuracy is therefore observed as well as a mediocre quality picture on the indicator (the echo appears as dots on the screen).

The invention aims at overcoming the above mentioned disadvantages by adapting a type of post integration to the useful signal actually received after the Doppler filter.

SUMMARY OF THE INVENTION

The invention provides then a process for adapting the post integration in a switched pulse repetition frequency radar, in which detection signals are provided over links for each pulse repetition frequency, comprising the following steps:

summation of the detection signals producing a threshold level signal depending on the number of links identified;

comparison of the summation of the signals with the threshold level signal and provision of an output signal when said summation is greater than the threshold level signal.

The invention also relates to a circuit for adapting the post integration in a switched pulse repetition frequency radar, comprising antenna reception circuits supplying a detected signal over an output link, using the above process and comprising:

a switch having an input connected to the link of the reception circuits and a given number of outputs, each corresponding to a pulse repetition frequency of the radar, said switch allowing its input to be connected to the output corresponding to the current pulse repetition frequency;

a summation register connected to each output and outputting a summed signal value;

a circuit for producing threshold level signals each corresponding to the number of predetected signals;

a summation circuit connected to the outputs of the summation registers, effecting a summation of the signals supplied at the outputs of the summation registers;

a comparator circuit connected on the one hand to the summation circuit, receiving summation results and, on the other, to the threshold level signal producing circuit, and outputting a signal when a summation result exceeds the value of the threshold level signal;

a control unit delivering successive combinations of control signals each controlling the closure of a certain number of switches, said combinations of control signals each controlling the threshold level signal producing circuit so that it supplies at each time a threshold level signal related to the number of control signals.

DESCRIPTION OF THE DRAWINGS

The different objects and features of the invention will be better understood from reading the following description, given by way of example with reference to the accompanying Figures in which:

FIG. 1 shows an example of a Doppler filter pattern,

FIGS. 2 to 9 shows curves of echo signals obtained from known systems;

FIG. 10 shows one embodiment of the circuits of the invention;

FIG. 11 shows one embodiment of a variant of the invention;

FIG. 12 shows one embodiment of another variant of the invention.

DESCRIPTION OF THE PREFERRED EMBODIMENT

Eliminating the velocity holes involves varying the frequency FR during the passage time T of the beam across the target, whereas eliminating the fixed echoes of second scanning, permitted by the coherence of the transmitter, require keeping FR constant. A compromise is obtained by dividing the passage time T into n equal blocks, where n is the minimum number of values of FR allowing all the velocity holes to be filled. The recurrence frequency will be switched cyclically every T/n seconds and will assume sucessively n values $F_i$.

For example, in the rest of the description, four frequencies will be chosen: F1, F2, F3 and F4 switched every 20 ms.

Let $f_d$ be the Doppler frequency of a target measured with respect to the Doppler of the ground echoes which is assumed to be constant during the illumination time T, and $F_i$ the instantaneous recurrence frequency. The reduced Doppler frequency is:

$$f_i = \frac{f_d \text{ modulo } F_i}{F_i} = \text{decimal part}\left(\frac{f_d}{F_i}\right)$$

Since the pattern of the filter has a rectangular shape, a number $a_i$ may be associated with $f_i$ such that:

$a_i = 0$ if $f_i$ is in the rejection zone of the filter, $a_i = 1$ in the opposite case.

For each value of $f_d$, the four values of $a_i$ corresponding to the four frequencies $f_i$ may be calculated which indicates, in a first approximation, how the target will appear at the output of the Doppler filter and at the input of the post integration.

In FIGS. 2 to 9 different cases of integration have been shown by plotting the time as abscissa and the levels of the signals as ordinates.

If 1 is the standardized value reached by an echo when it is in the pass band of the filter, the amplitude of the echo varies during a sweep in accordance with the sequence $a_i, a_{i+1}, a_{i+2}, a_{i+3}$ with four recurrence frequencies.

For example, an echo may appear in one of the four following forms:
case 1: 1100
case 2: 0110
case 3: 0011
case 4: 1001

The first three forms are shown in FIG. 2 and the fourth form in FIG. 6.

A conventional post integration, adapted to the passage time T, provides the correlation between the incident signal and a square wave of width T. For the echo considered, results are different in cases 1, 2, 3 (FIG. 3) where the output reaches the value $\frac{1}{2}$ (with respect to the value which would be reached for 1111) and case 4 where the output signals is formed of a peak of amplitude $\frac{1}{2}$ (FIG. 7).

A post integration adapted to T/2 gives a single amplitude peak 1 in cases 1, 2, 3 as is shown in FIG. 4, and two peaks of amplitude $\frac{1}{2}$ for case 4 such as shown in FIG. 8. In this case, the noise power is twice as high as in the first case.

If the results are expressed as signal to noise ratio, related to the reference case, for an echo 1111 we obtain:
in integration on T,
cases 1, 2, 3: S/B = −6 dB wide echo
case 4: S/B = −6 dB narrow echo
in integration on T/2,
cases 1, 2, 3: S/B = −3 dB a single peak
case 4: S/B = −9 dB two peaks For an echo appearing only during T/2 the minimum theoretical loss is −3 dB.

For a post integration adapted to T, the loss is therefore 3 dB with respect to the optimum value.

For a post integration adapted to T/2, the loss is zero for cases 1, 2, 3 but it is 6 dB for case 4.

So as to adapt the post integration to case 4, $a_1$ and $a_4$ should be summed, that is to say the correlation of the signal of case 4 with the sequence 1001.

In this case, the amplitude peak would have an amplitude of 1 corresponding to the optimum case (but would be misadapted in the other cases).

FIG. 9 shows that the echo, at the output of the matched filter may have peaks due to secondary lobes of the correlation, which could degrade the quality of the representation. In fact, these secondary lobes correspond to a relative echo-beam position for which the post integration considered is mismatched. In this case, there exists at least one combination adapted to this state which gives a higher level. Similary, for each echo position there exists an adapted combination. Therefore if the secondary lobes have a sufficient level to be seen, the echo will also be seen for the intermediate positions. It will be in the form of a single line without discontinuity.

The circuits of the invention are used every T/4. There are about 1000 distance quanta to be processed in 20 ms, which gives a computing cycle time of 20 ms.

Referring to FIGS. 10 to 12, the system of the invention will now be described for adapting the post integration to a switched recurrence frequency system.

FIG. 10 gives one embodiment of the circuit of the invention for adapting the post integration.

In this Figure can be seen a radar receiving circuit E1 supplying over an output link 10 a received signal value. This output link 10 is connected to the input of a switch M1 (or multiplexer) allowing link 10 to be connected successively through outputs 11, 12, 13, 14 to the inputs of the summing registers F1, F2, F3 and F4.

As many summing registers (F1 to F4) are required as there are pulse repetition frequencies, namely 4 in this example.

Switch M1 is switched from one output position (11 for example) to the next one (12 in this example) at each repetition frequency switching under the control of a signal UC1 supplied by control unit UC.

Each summing register, which comprises as many memory cells as there are distance quanta in the range, computes the sum of the signal from the receiver, during a duration of T/4 corresponding to the period such that $F_R = F_i$. This summation is effected cyclically, the register being reset at each cycle.

At the time of the switching of $F_R$, four data are available as the outputs $\Sigma_1, \Sigma_2, \Sigma_3, \Sigma_4$, which represent the partial sums corresponding to a duration T. These data are renewed every T/4.

To the outputs Σ1 to Σ4 of the summation registers (F1 to F4) are connected, through switches C1 to C4, a summation circuit C2. A circuit for producing threshold level signals S1 is also connected to the outputs Σ1 to Σ4.

A control unit UC delivers different control signals UC1, UC2, b1, b2, b3, and b4.

Signal UC1 controls the switching of switch M1 from one position to the next for each repetition frequency change.

Signals b1 to b4 are delivered in the form of a series of successive combinations of signals and control the closure of switches C1 to C4, so that each combination allows one or more switches to be closed.

Each combination of signals b1 to b4 is also supplied to the circuit for producing threshold level signals S1 which delivers, in response, a signal s1 whose level corresponds to the number of signals (b1 to b4) delivered.

The signal UC2 is delivered, for each combination of signals b1 to b4, to the summing circuit CS.

The summing circuit CS adds the signals Σ1 to Σ4 received from the summing registers F1 to F4 through switches C1 to C4.

The summing circuit CS delivers a signal r1 representing the sum of the signals Σ1 to Σ4. The signal r1 as well as the signal s1 are applied to the inputs of a comparator circuit A5 which delivers a signal, at an output AFF, to the user circuits not shown, if the signal r1 is at a level higher than that of the signal s1.

Thus, the circuit of FIG. 10 indeed provides post integration of the signals adapted to the combination of the signals received.

Referring to FIG. 11, a variant of the embodiment of the circuit of the invention will now be described.

The preceding circuit was based on the fact that the type of echo received, i.e. the sequence $a_i$, was not known.

The variant of FIG. 11, provides a circuit for detecting the processed sequence of $a_i$.

The function thus performed will be much simpler than in the preceding case since it is sufficient to select, as a function of the $a_i$s, the type of sum to be made and the threshold to be placed.

In FIG. 11, we find again the reception circuit E1, the switch M1, the summation registers F1 to F4, the summation circuit CS and the circuit S1 for elaborating threshold level signals.

In addition, threshold circuits A1, A2, A3, and A4 are connected to the outputs of the summing registers F1, F2, F3 and F4 respectively. Each of these compares the level of the signal $\Sigma1$ to $\Sigma4$ that it receives with a signal S of given level and delivers a signal of binary value 1 to 0 at its output a1 to a4 depending on whether the level of the signal received is higher than the level of the signal S or not.

The outputs of the summing registers F1 to F4 are further connected to the inputs of the summing circuit CS through switches C1 to C4 respectively. These switches receive the signals delivered at the outputs a1 to a4 of the threshold circuits F1 to F4. A signal of binary value 1 at an output a1 to a4 controls the closure of the corresponding switch C1 to C4. Thus, only the signals $\Sigma1$ to $\Sigma4$ having a sufficient level are transmitted to the summing circuit C2, which eliminates the noises received.

The outputs a1 to a4 are also connected to the inputs of the circuit s1 elaborating threshold level signals. This latter supplies at an output s1, a signal which may take on four possible values depending on the number of outputs a1 to a4 found at logic level 1.

The summation circuit CS delivers a summation signal of the signals $\Sigma1$ to $\Sigma4$ which it receives. This summation signal is transmitted to an input of a comparator circuit A5 whose other input is connected to the output s1.

The comparator circuit A5 delivers a signal of given level at an output AFF towards user circuits not shown when the level of the summation signal is greater than the level of the signal received from output s1.

As in the embodiment shown in FIG. 10, the circuits are here controlled by a control unit UC delivering the control signals UC1 and UC2. The signal UC1 controls switch M1 and the signal UC2 controls the summation circuit CS and the threshold level circuit S1.

Thus, the embodiment shown in FIG. 11 allows the recurrence frequencies to be detected for which there is a signal predetection and so the form of the received signal from the reception circuits E1 to be recognized. Then it allows a post integration to be made adapted to this form by closing the appropriate switches C1 to C4, then a detection threshold to be placed itself adapted (circuit S1) to the type of post integration effected. The losses are thus minimized.

Referring to FIG. 12, one example of another variant for implementing the invention will now be described.

In this variant, the shape of the received signal is unknown as in the variant of FIG. 10. On the other hand, the comparison and summation operations will be carried out simultaneously and so in parallel and not sequentially as in the system of FIG. 10.

The first part of the circuit comprises the reception circuits E1, the switch M1, four summation registers F1 to F4 assigned to each recurrence frequency.

To the outputs of registers F1 to F4 are connected summation circuits CS1, CS2, and CS3. The summing circuit CS1 combines the data $\Sigma1$, $\Sigma2$, $\Sigma3$, $\Sigma4$ two by two and delivers the sum of the signals of each combination over specific links ($\Sigma1+\Sigma2$) to ($\Sigma3+\Sigma4$), which produces six results.

The circuit CS2 combines the data $\Sigma1$ to $\Sigma4$ three by three and delivers the sum of the signals of each combination over links ($\Sigma1+\Sigma2+\Sigma3$) to ($\Sigma2+\Sigma3+\Sigma4$), which gives four results.

Finally, a circuit CS3 adds the signals $\Sigma1$ to $\Sigma4$ and delivers a resultant signal over a link $\Sigma1+\Sigma2+\Sigma3+\Sigma4$.

The different output links of the summing circuits CS1 to CS3 as well as links $\Sigma1$ to $\Sigma4$ are connected to comparator circuits A11. Having fifteen links in all, fifteen comparator circuits A11 must be provided.

Futhermore, a threshold level signal elaboration circuit S1 delivers four threshold signals S10, S20, S30, S40.

The threshold signal S10 corresponds to the reception of a single signal $\Sigma i$. It is applied to the comparator circuits A11 to which the links $\Sigma1$ to $\Sigma4$ are connected.

The threshold signal S20 corresponds to the reception of two signals $\Sigma i$. It is applied to the comparator circuits A11 to which the output links of the summing circuits CS1 are connected.

The threshold signal S30 corresponds to the reception of three signals $\Sigma i$. It is applied to the comparator circuits A11 to which the output links of the summing circuits CS2 are connected.

Finally, the threshold signal S40 corresponds to the reception of four signals $\Sigma i$. It is applied to the comparator circuit A11 to which the output link of the summing circuit CS3 is connected.

These data $\Sigma1$ to $\Sigma4$ are therefore combined together so as to form fifteen sums, corresponding to the fifteen possible combinations. The result of each sum is compared with a threshold which depends on the number of summations effected.

The outputs of the comparator cicuits A11 are connected to the inputs of an OR circuit having fifteen inputs and delivering a signal of logic level 1 at an output AFF when one threshold circuit at least delivers a signal indicating that a combination has exceeded the threshold with which it is compared.

The logic sum of the fifteen outputs forms the detection signal which is renewed every T/4.

What is claimed is:

1. A circuit for adapting the post integration in a switched pulse repetition frequency radar, comprising antenna reception circuits delivering a detected signal over an output link comprising;
    a switch having an input connected to the link of the reception circuits and a given number of outputs each corresponding to a recurrence frequency of the radar, said switch allowing its input to be connected to the output corresponding to the current repetition frequency;
    a summing register connected to each output and delivering at its output a summed signal value;
    a circuit for producing threshold level signals each corresponding to the number of predetected signals;

a summing circuit connected to the outputs of the summing registers, summing the signals delivered at the outputs of the summing registers;

a comparator circuit connected on the one hand to the summing circuit receiving integration results and, on the other, to the circuit elaborating threshold level signals, and delivering an output signal when an integration result exceeds the value of the threshold level corresponding to the number of recurrence outputs having supplied a detection signal;

a control unit delivering successive combinations of control signals each controlling the closure of a certain number of switches, said control signal combinations each controlling the circuit elaborating threshold level signals so that it delivers each time a threshold level signal in relation with the number of control signals.

2. A circuit for adapting the post integration in a switched pulse repetition frequency radar such as claimed in claim 1, comprising:

connected to the output of each summing register, a comparator circuit comparing the level of the output of the register with a given threshold signal and delivering a detection signal (0 or 1) indicating the recurrence frequencies for which there is predetection;

switches each controlled by a detection signal and allowing the outputs of the summing registers to be connected to the summing circuit;

the circuit for elaborating the threshold level signals being also controlled by the detection signals from the comparator circuits and delivering at an output a signal whose level depends on the number of detection signals received, said output being connected to said comparator circuit.

3. A circuit for adapting the post integration in a switched pulse repeition frequency radar comprising antenna reception circuits delivering a detected signal over an output link and having n recurrence frequencies, comprising:

a switch having an input connected to the link of the reception circuits and a given number of outputs each corresponding to a recurrence frequency of the radar, said switch allowing its input to be connected to the output corresponding to the current repetition frequency;

a summing register connected to each output and delivering at its output a summed signal value;

a series of $n-1$ summing circuits having as many inputs as there are summing registers, each connected to the output of a summing register, each summing circuit effecting the summing of p signals from the n signals delivered by the summing registers and thus delivering addition signals on:

$$\frac{n(n-1)\ldots(n-\ )+1)}{p!} \text{ outputs}$$

an assembly of comparator circuits connected to the outputs of each summing circuit, each of these assemblies comprising as many comparator circuits as the corresponding summing circuit has ouputs, the comparator circuits of one assembly further receiving a threshold level signal whose value is propoer to the assembly considered and determines the operation of the comparator circuits receiving from the summing circuits a summing signal;

as assembly of n comparator circuits each connected to an output of a summing register, each of these threshold circuits further receiving a given threshold level signal, allowing its operation when the summing register delivers at the corresponding output a signal of a level greater than the threshold level, a logic OR gate connected to all the comparator circuits and delivering an output signal when one threshold circuit at least operates.

* * * * *